United States Patent
Kapoor et al.

(10) Patent No.: US 7,171,399 B2
(45) Date of Patent: *Jan. 30, 2007

(54) METHOD FOR EFFICIENT QUERY EXECUTION USING DYNAMIC QUERIES IN DATABASE ENVIRONMENTS

(75) Inventors: Rahul Kapoor, Bellevue, WA (US); Nigel R. Ellis, Redmond, WA (US); Prakash Sundaresan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/996,946

(22) Filed: Nov. 24, 2004

(65) Prior Publication Data

US 2005/0097099 A1 May 5, 2005

Related U.S. Application Data

(63) Continuation of application No. 10/830,584, filed on Apr. 23, 2004, which is a continuation of application No. 09/839,807, filed on Apr. 20, 2001, now Pat. No. 6,789,071.

(51) Int. Cl.
*G06F 17/30* (2006.01)

(52) U.S. Cl. .................... 707/2; 707/3; 707/4; 707/6; 707/100; 707/10

(58) Field of Classification Search ............... 707/2–4, 707/7, 6, 100, 10
See application file for complete search history.

(56) References Cited

U.S. PATENT DOCUMENTS

| | | | | |
|---|---|---|---|---|
| 5,412,804 A * | 5/1995 | Krishna | ........................ | 707/2 |
| 5,600,831 A * | 2/1997 | Levy et al. | .................... | 707/2 |
| 5,740,440 A * | 4/1998 | West | ........................ | 717/125 |
| 6,275,818 B1 * | 8/2001 | Subramanian et al. | ......... | 707/2 |
| 6,604,100 B1 * | 8/2003 | Fernandez et al. | ............ | 707/3 |
| 6,785,668 B1 * | 8/2004 | Polo et al. | .................... | 707/2 |
| 6,845,373 B2 * | 1/2005 | Linhart | ........................ | 707/3 |

* cited by examiner

*Primary Examiner*—Cam-Y Truong
(74) *Attorney, Agent, or Firm*—Woodcock Washburn LLP

(57) ABSTRACT

A system and method allowing for optimization of query execution in database environments is provided. In an illustrative implementation, a database having distributed partitioned views is provided such that queries may initiate at any of the participating data stores. In operation, an offered query is analyzed to determine if it has predicate expression and/or sub-queries. Using this information the expressions and/or sub-queries are analyzed and processed to determine if appropriate start-up filters are available for the offered query. The start-up filters are applied to the query such that during compile and/or run time, redundant partitions in the distributed partitioned database environment are eliminated during query execution.

16 Claims, 12 Drawing Sheets

METHOD FOR EFFICIENT QUERY EXECUTION USING DYNAMIC QUERIES IN DATABASE ENVIRONMENTS

CROSS-REFERENCE TO RELATED APPLICATIONS

This application is a continuation of U.S. patent application Ser. No. 10/830,584, filed Apr. 23, 2004 which is a continuation of Ser. No. 09/839,807, filed Apr. 20, 2001, now U.S. Pat. No. 6,789,071, issued on Sep. 7, 2004. The disclosures of the foregoing applications are incorporated herein by reference in their entirety.

BACKGROUND OF THE INVENTION

1. Field of the Invention

The present invention relates generally to the field of database systems and, more particularly, to a system and method allowing for the creation and execution of scalar-based queries in database environments.

2. Brief Description of Prior Developments

Database systems store, retrieve, and process information. In order to retrieve information from the database, a user provides a query (written in a query language such as SQL), where the query specifies the information to be retrieved and the manner in which it is to be manipulated or evaluated in order to provide a useful result. To process the query, the database system converts the query into a relational expression that describes algebraically the result specified by the query. The relational expression is then used to produce an execution plan, which describes particular steps to be taken by a computer in order to produce the sought result.

Database environments comprise various configurations having cooperating homogeneous and/or heterogeneous data stores. These data stores generally maintain data in tables (T) that may reside locally on a single data store or may be distributed among several data stores in a distributed database environment. Included in the category of distributed database environments are clustered databases and federated databases. A clustered database configuration contemplates several data stores closely cooperating to produce a singular view of the data stored on the data stores. Comparatively, a database federation is a group of data stores (e.g. computer servers) that are administered independently, but which cooperate to share the processing load of a system. These various database environments support a number of views that may be imposed to better manage the underlying table (T) data. For example, these database environments (e.g. stand-alone, clustered, and federated) may be partitioned such that the table or tables storing data may be more efficiently handled. In the case of distributed database environments, distributed partitioned views may be created.

Generally, a partitioned view joins horizontally partitioned data from a set of member tables across one or more data stores making the data as if it appears from one database table. In a local partitioned view, all participating tables and the view reside on the same instance of the data store (e.g. the same instance of SQL server). In a distributed partitioned view, at least one of the participating tables resides on a different (i.e. remote) data store. For partitioned tables to exist the location of single data row in a partitioned table (T) must be uniquely located. Current implementations satisfy this requirement through the use of ranges (e.g. column and/or row ranges), or, through hashing functions which operate on columns and/or rows. In the ranges-based implementation, the member tables of the partitioned view are designed so that each table stores a horizontal slice of the original table based on a range of key values. The ranges are based on the data values in a partitioning column. The partitioning column serves to contain values that facilitate the creation and maintenance of partitioned views in partitioned database environments.

The member tables of the partitioned view are designed so that each table stores a horizontal slice of the original table based on a range of key values. The ranges are based on the data values in a partitioning column. The range of values in each member table is enforced by a database environment constraint (e.g. CHECK constraint) on the partitioning column, such that ranges do not overlap.

Current practices allow queries to be performed on partitioned views such that desired data is identified, retrieved, and returned to participating users. In the context of executing queries in distributed database environments, such practices lend to inefficient and non-optimal uses of processing resources. Stated differently, tables residing on a number of data stores may require numerous processing steps to satisfy offered requests. For example, if data is to be retrieved from remote participating data stores in a partitioned database environments, a number of unnecessary steps, such as, reading from redundant partitions may be performed.

In view of the foregoing, it is appreciated that there exists a need for an improved query execution strategy that overcomes the drawbacks of existing practices.

SUMMARY OF THE INVENTION

Generally the present invention provides a system and methods that allow for a novel optimization of queries in database environments by using scalar-based queries. In an illustrative implementation, queries are executed using startup filters. A startup filter is a building block used to implement dynamic plan executions in database environments. The generation of startup filters can occur in two possible circumstances—that is, as part of sub-queries or, alternatively, from scalar predicates. When a predicate context has been identified as a suitable point for the startup filter generation, the predicate is analyzed to determine if there are any restrictions being applied to columns of the queried table that may have single-column CHECK constraints defined. Generally, a single column CHECK constraint is a predicate that is applied for every column modification (e.g. INSERT or UPDATE). In operation, An analysis of the scalar predicate to determine if a start-up filter would be appropriate to execute offered queries. In the implementation, the analysis of the scalar predicate expression comprises the acts of determining whether: 1) there are suitable startup expressions for offered scalar predicates; and 2) there are suitable startup expressions the conjunction (i.e. AND of all of the expressions) is returned. As part of the determination of suitable startup expressions a number of functions and operations are performed. These functions serve to pair down suitable startup expressions that will satisfy the inputted scalar predicate of the original query. Included in the execution of these functions is parameterized execution that serves to facilitate the processing of data that may reside on remote data stores.

Alternatively, offered queries contexts (as opposed to a scalar predicate contexts) can serve as a suitable point for startup filter generation. In operation, offered queries are first analyzed to determine where there may be any restrictions that have been Applied. Using the restrictions, suitable start-up filters are identified for use in query execution. The determination of appropriate startup expressions for offered queries may be realized through steps comprising the execution of data functions. Such functions serve to find the startup expression most suitable for offered queries.

Further aspects of the invention are described below.

DETAILED DESCRIPTION OF THE DRAWINGS

The system and methods providing the creation and execution of scalar-based queries in database environments are further described with reference to the accompanying drawings in which.

DETAILED DESCRIPTION OF ILLUSTRATIVE IMPLEMENTATIONS

Overview

Figure 1:
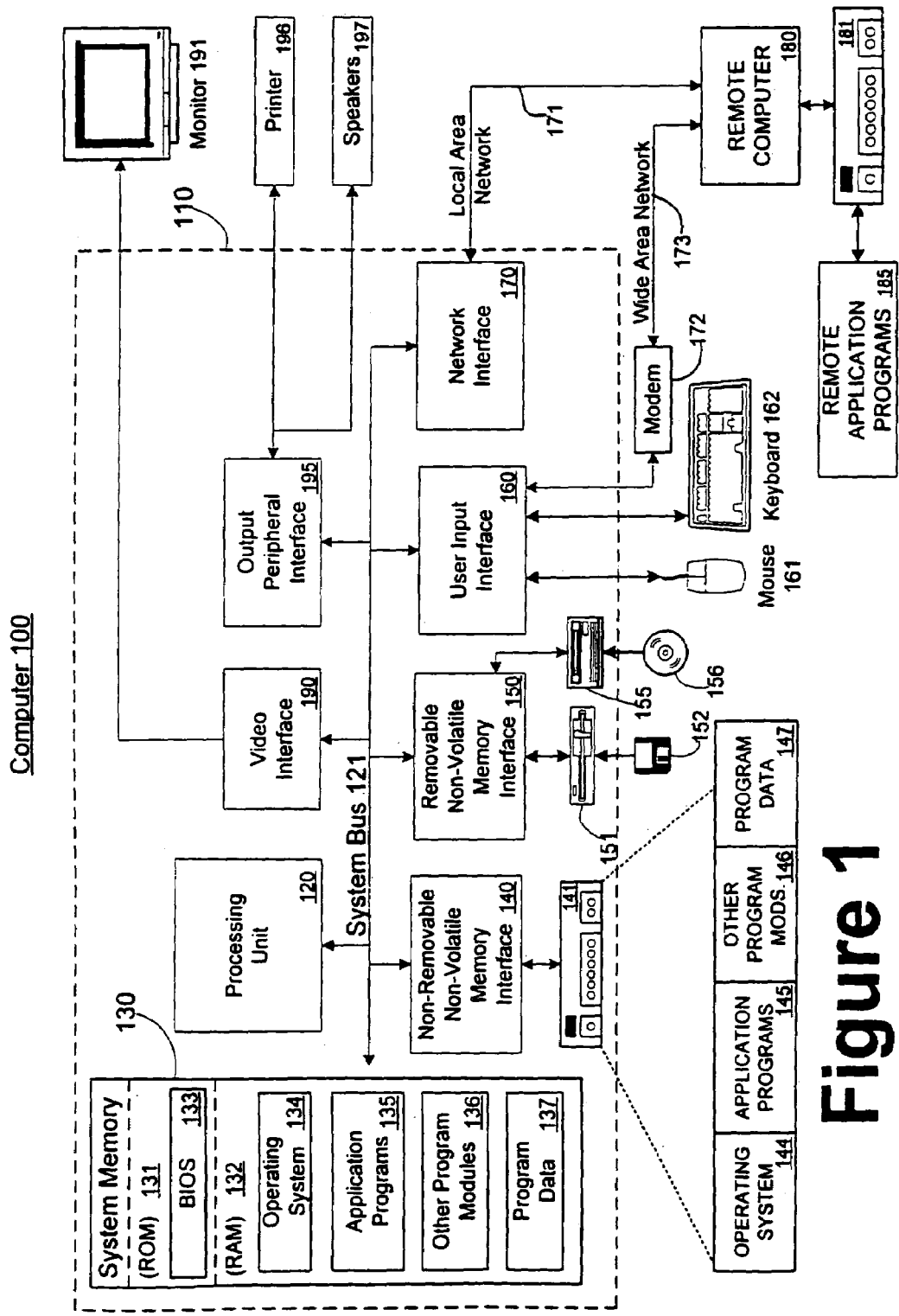
FIG. 1 is a block diagram of an exemplary computing environment in which aspects of the present invention may be incorporated.

Data store designers and operators, alike, are constantly striving to maximize processing efficiencies and to increase data store volume capacities. Recent developments in data store design allow for efficient processing, management, and storage of large volumes of data. For example, distributed database environments, such as, clustered databases and federated databases allow large volumes of data to be stored, and subsequently, processed on a plurality of cooperating data stores. With clustered databases, the data stores act in conjunction to create a seamless environment providing a singular view of the underlying data. Comparatively, federated databases comprise data stores that are more loosely coupled such that each data store operates independent from each other but can communicate information between each other.

Along with distributed database environments, other advances, such as, the development of partitioned views, and distributed partitioned views have allowed for more efficient processing and better management of data. A partitioned view joins partitioned data from a set of member tables across one or more servers, making the data appear as if it were from one table. In a distributed partitioned view, at least one of the partitioning tables resides on a different (remote) data store. Distributed partitioned views can be used to implement a database federation. A table must first be partitioned before implementing a partitioned view. In this instance, the original table is replaced with several smaller member tables. Each member table has the same number of columns as the original table, and each column has the same attributes (such as data type, size, collation) as the corresponding column in the original table. In the case of distributed partitioned views, each member table resides on a separate member data store. To achieve the greatest location transparency, the name of the cooperating member data stores should be the same on each of the cooperating member data stores. For example, in a database federation having three data stores, the data store names may be DataStore1.CustomerDB, DataStore2.CustomerDB, and DataStore3.CustomerDB. Generally, the member tables are designed such that each member table stores a horizontal slice of the original table based on a range of key values. The ranges are based on the data values in a partitioning column. The range of values in each member table is enforced by a CHECK constraint on the partitioning column, such that ranges cannot overlap. For example, a member table having a range from 1 through 200000 can not coexist with another member table having a range from 150000 through 300000 because it would not be clear which member table contains the values from 150000 to 200000.

Applying the above conditions, an exemplary table "Customer" may be partitioned into three member tables (residing on three cooperating data stores) using the CHECK constraint with the following pseudo-code:

```
-- On Data Store 1:
    CREATE TABLE Customer_33
        (CustomerID INTEGER NOT NULL PRIMARY KEY
            CHECK (CustomerID BETWEEN 1 AND 32999),
        ... -- Additional Column Definitions)
-- On Data Store 2:
    CREATE TABLE Customer_66
        (CustomerID INTEGER NOT NULL PRIMARY KEY
            CHECK (CustomerID BETWEEN 33000 AND 65999),
        ... -- Additional Column Definitions)
-- On Data Store 3:
    CREATE TABLE Customer_99
        (CustomerID INTEGER NOT NULL PRIMARY KEY
            CHECK (CustomerID BETWEEN 66000 AND 99999),
        ... -- Additional Column Definitions)
```

The member tables having been created, a distributed partitioned view can be created on each member data store, with each view having the same name. This allows queries referencing the distributed partitioned view name to run on any of the member data stores. In operation, the system behaves as if a copy of the original table is on each member data store, where in reality each data store has only a member table and a distributed partitioned view.

A distributed partitioned view can be built by adding linked data store definitions on each member data store containing the connection information needed to execute distributed queries on the other member data stores. This gives a distributed partitioned view access to data on the other cooperating data stores. In addition, a distributed partitioned view should be created on each member data store. The views use distributed SELECT statements to access data from the linked member data stores, and merge the distributed rows with rows from local member tables. For the exemplary table provided, a distributed partitioned view may be created by adding a linked-data store definition named DataStore2 with the connection information for DataStore2 and linked-data store definition named DataStore3 for access to DataStore3 on Data Store 1 (the same step is repeated for Data Stores 2 and 3). Further, distributed partitioned views are created for Data Stores 1, 2, and 3, using the following pseudo-code:

```
CREATE VIEW Customer AS
    SELECT * FROM CompanyDatabase.TableOwner.Customers_33
UNION ALL
    SELECT * FROM
    DataStore2.CompanyDatabase.TableOwner.Customers_66
UNION ALL
    SELECT * FROM
    DataStore3.CompanyDatabse.TableOwner.Customers_99
```

Once the distributed partitioned views are created, queries may be executed against them to retrieve, update, modify, and display desired data. These queries are part of execution plans that are performed in various database environments. Conventional practices necessitated inefficient processing of desired data. That is, if desired data resides in remote tables on remote participating data stores, conventional query execution plans sometimes require processing and re-processing of redundant partitions of a partitioned database environment. Such technique places significant burdens on processing resources.

The present invention aims to ameliorate the shortcomings of existing practices by providing a system and methods that allow for efficient processing of queries in database environments. In an illustrative implementation, the query is analyzed to determine if the query has a predicate expression and/or maintains sub-queries. Using the results of this analysis, a series of checks are performed to determine if there may be an appropriate start-up filter that be applied to the offered query to remove partition redundancy and optimize processing efficiencies.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media comprises computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Database Environment

Figure 2:
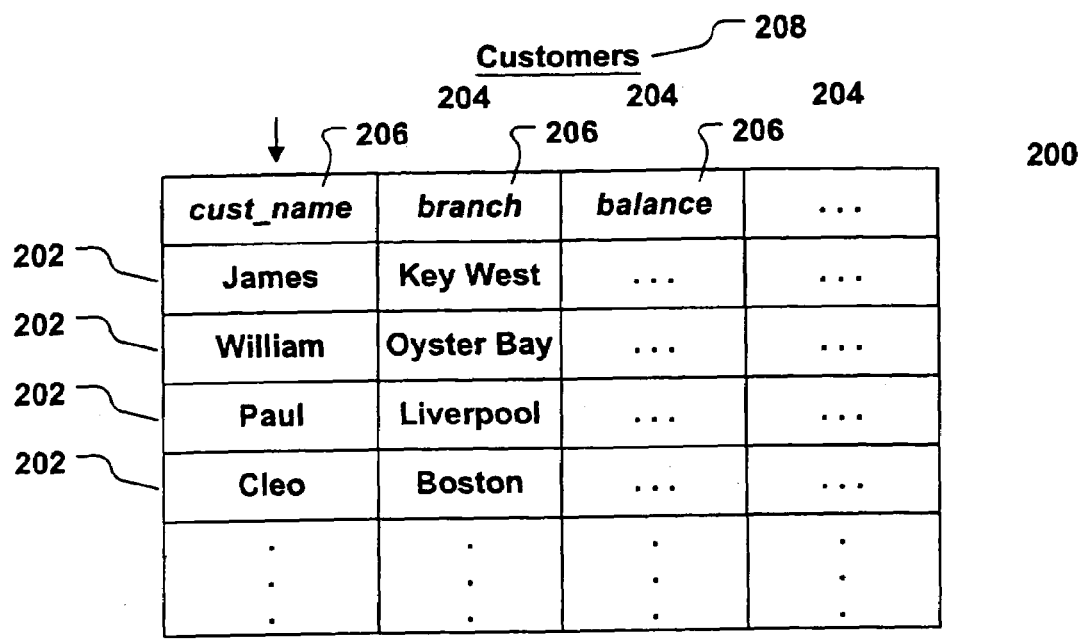
FIG. 2 is a block diagram of an exemplary table which stores data in accordance with the present invention.

Modern database systems, particularly those based on the relational model, store data in the form of tables. A table is a collection of data organized into rows and columns. FIG. 2 shows an exemplary table 200. In this example, table 200 is a list of bank customers, showing each customer's branch and balance. Table 200 has rows 202 and columns 204. Each column 204 has a name 206. Table 200 may also have a name 208. In the example of FIG. 2, table 200 has the name 208 "Customers." Table 200 has three columns 204. The names 206 of columns 204 are "cust_name," "branch," and "balance," respectively. The first row 202 of table 200 contains the data "James," "Key West," and "$1000." In the terminology of database systems, table 200 is sometimes referred to as a "relation," each row 202 as a "tuple," and the name 206 of each column as an "attribute." It will be appreciated that the depiction of table 200 in FIG. 2 is merely exemplary. A table may have any number of rows and columns, and may store any type of data, without departing from the spirit and scope of the invention.

Figure 2A:
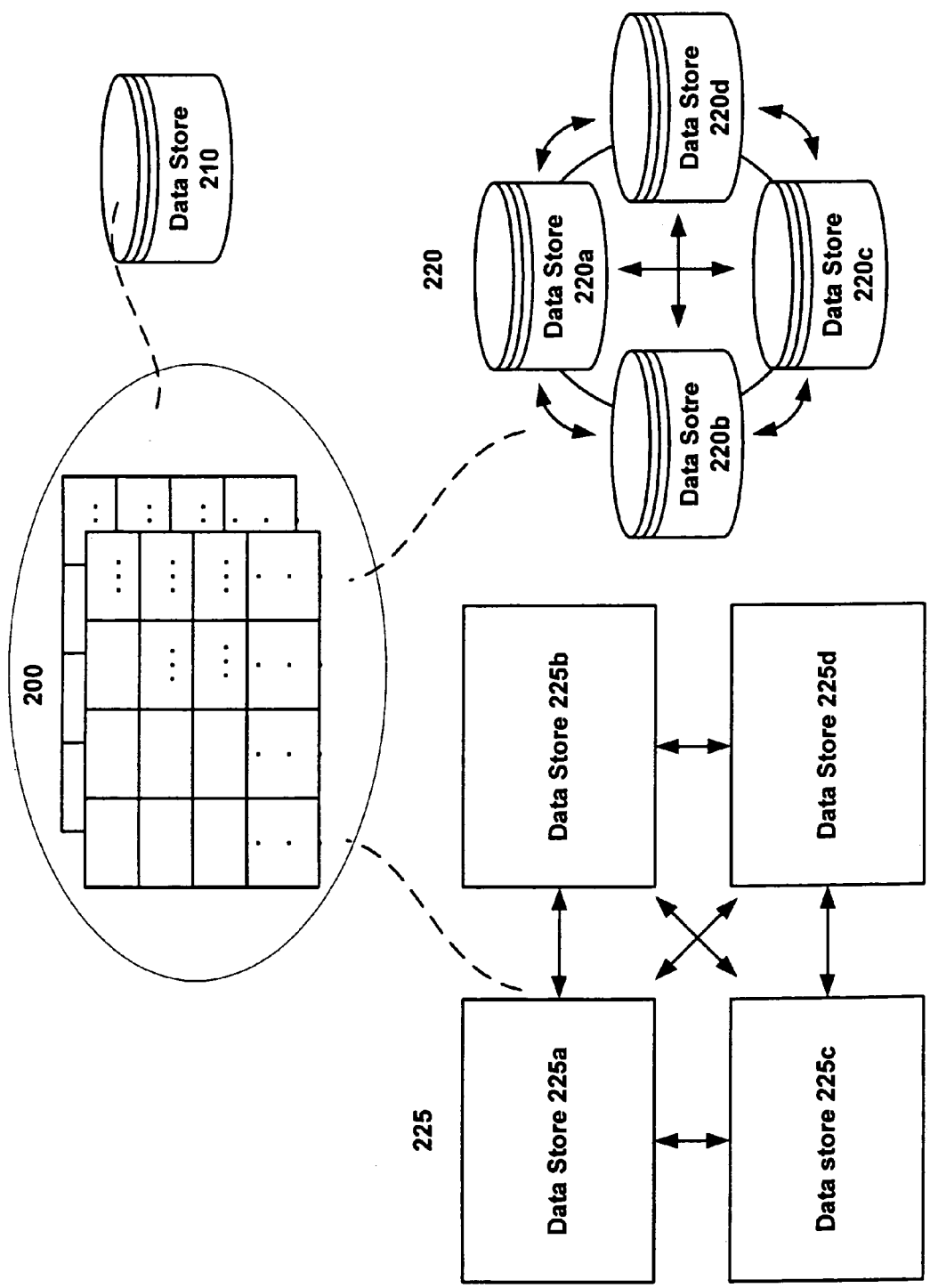
FIG. 2A is a block diagram of exemplary distributed database environments in accordance with the present invention.
Figure 3:
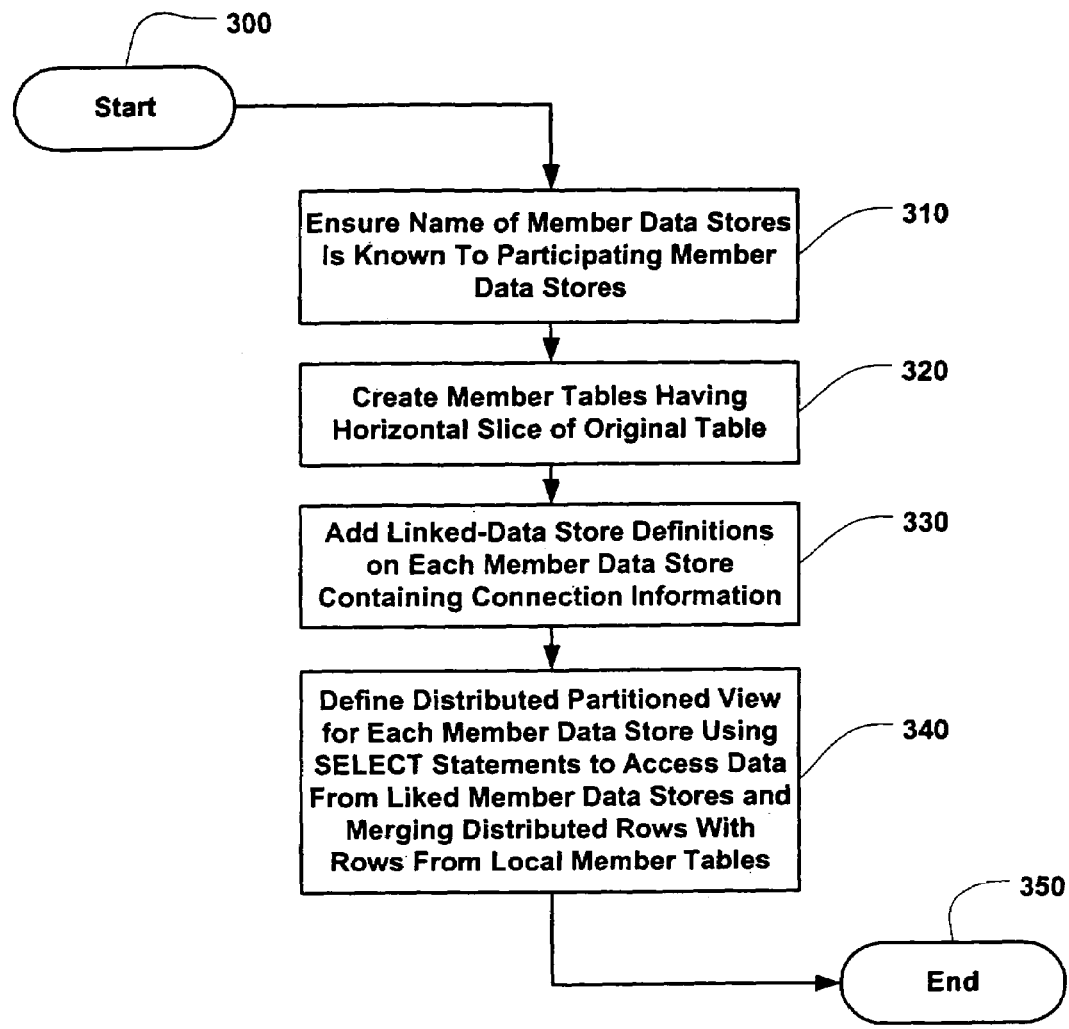
FIG. 3 is a flow diagram of the processing performed to create an exemplary federated database environment having distributed partitioned views in accordance with the present invention.

As shown in FIG. 2A, exemplary table 200 may reside on a single data store 210 or, alternatively, may be distributed over a number of interconnected data stores, such as data stores 220 and 225. The interconnected data stores may be interconnected such that data store cluster 220 (having data stores 220a, 220b, 220c, and 220d) is formed. Generally, a cluster is a group of independent systems working together as a single system. A client interacts with a cluster as though the cluster is a single server, even though many servers may be clustered together. The cluster also provides a single management entity. Cluster configurations are used to provide higher availability, easier manageability and wider scalability. Alternatively, the data stores may be arranged such that a federation of data stores 225 is created. Clustered data stores generally are "tightly" connected requiring extensive sharing of configuration information and table properties. Comparatively, with data store federation, the relationship is such that the data stores are more loosely coupled. Stated differently, the data stores of a federation are independent, but one data store can call on other data stores to supply information.

As shown in FIG. 2A, data store federation 225 comprises a number of data stores 225a, 225b, 225c, and 225d. These data stores act independently from each other but are coupled such that data may be shared among them. In an illustrative implementation, database federation 225 may house data tables capable of having partitioned views. A partitioned view joins partitioned data from a set of member tables across one or more data stores (or data servers), making the data appear as if from one table. A distinction can be made between a local and distributed partitioned view. In a local partitioned view, all participating tables and the view reside on the same instance of a data store management application (e.g. Microsoft® SQL Server™ 2000). In a distributed portioned view, at least one of the participating tables resides on a different (remote) server. Generally, distributed partitioned views can be used to implement a federation of database servers.

Partitioned Views:

Partitioned views generally allow data that is stored in large tables to be split into smaller member tables. In an exemplary operation, the data is partitioned between member tables based on ranges of data values in one of the columns. The data ranges for each member table are defined in a CHECK constraint specified on the partitioning column. A view that uses UNION ALL to combine selects of all the member tables into a single result set is then defined. When SELECT statements referencing the view specify a search condition on the partition column, the query processor of the data store uses the CHECK constraint definitions to determine which member table contains the rows.

For example, a sales table that records sales for 1998 can be partitioned into 12 member tables, one for each month. Each member table has a constraint defined in the Order-Month column as described by the following pseudo-code:

```
CREATE TABLE May1998Sales
    (OrderID      INT       PRIMARY KEY,
    CustomerID    INT                    NOT NULL,
    OrderDate     DATETIME               NULL
        CHECK (DATEPART(yy, OrderDate) = 1998),
    OrderMonth             INT NOT NULL
        CHECK (OrderMonth = 5),
    DeliveryDate           DATETIME      NULL,
        CHECK (DATEPART (mm, OrderDate) = OrderMonth)
    )
```

In the example provided, the application populating May 1998 Sales must ensure all rows have 5 in the OrderMonth column and the order date specifies a date in May, 1998. This is enforced by the constraints defined in the table. A view can then be defined that uses UNION ALL to select the data from all 12 member tables as a single result set:

```
CREATE VIEW Year1998Sales
    AS
    SELECT * FROM Jan1998Sales
    UNION ALL
    SELECT * FROM Feb1998Sales
    UNION ALL
    ...
    SELECT * FROM Dec1998Sales
    UNION ALL
```

Accordingly, the SELECT statement performed on the new view Year1998Sales

```
SELECT *
FROM Year 1998Sales
WHERE OrderMonth In (5,6) AND CustomerID = 64892
``` results in a search in the May 1998 Sales and Jun 1998 Sales tables (i.e. the $5^{th}$ and $6^{th}$ member table), and limits its search to those tables.

Generally, CHECK constraints are not needed for the partitioned view to return the correct results. However, if the CHECK constraints have not been defined, the query processor of the data stores must search all cooperating tables instead of only those that cover the search condition on the partitioning column. Without the CHECK constraints, the view operates like any other view with UNION ALL. The query processor on cooperating data stores will generally not make any assumptions about the values stored in different tables and it will generally not skip searching the tables that participate in the view definition. If all the member tables referenced by a partitioned view are on the same data store, the view is a local partitioned view. If the member tables are on multiple data stores, the view is a distributed partitioned view. When processing queries on distributed partitioned views an important variable that affects overall processing efficiency is the amount of data that is being transferred between cooperating data stores.

Start-Up Filters:

Some database environments, such as Microsoft's® SQL Server 2000™ build dynamic execution plans to make efficient use of distributed queries to access data from remote member tables (i.e. member tables residing on remote data stores resulting from the application of a distributed partitioned view on a particular table or tables). These dynamic plans may be created by first retrieving the CHECK constraint definitions from each member table (this allows the query processor to map the distribution key values across the member tables). The query processor then compares the key ranges specified in an SQL state WHERE clause to map showing how the rows are distributed in the member tables. The query processor then builds a query execution plan that uses distributed queries to retrieve only those remote rows needed to complete the SQL statement. The execution plan may also be built in such a way that any access to remote member table, for either data or meta data, are delayed until the information is required.

For example, a system may have a Customers table that is partitioned across DataStore1 (CustomerID from 1 through 32999), DataStore2 (CustomerID from 33000 to 65999), and DataStore3 (CustomerID from 66000–99999). The following query

```
SELECT *
FROM CompanyData.dbo.Customers
WHERE CustomerID BETWEEN 32000 and 34000
``` may be processed by the system by employing an execution plan that extracts rows with CustomerID key values from 32000 through 32999 from the local member table, and issues a distributed query to retrieve the rows with key values from 33000 through 34000 from DataStore2. In the case where a query is to be processed repetitively requiring extensive processing resources, the query may be parameterized such that the processing for the query is efficiently distributed among cooperating data stores. Parameterized queries are queries written for reusability. They contain parameter markers as placeholders for data that will change from execution to execution. In operation, a parameterized query may be realized as Structured Query Language (SQL) queries that require one or more parameters or arguments before execution. For example, an SQL statement that refers to a specific part number as supplied by the user would use a parameterized query to insert the user-provided number into the SQL statement before execution so that the query references that specific part.

In accordance with the present invention, once a query has been submitted against a distributed partitioned view, check constraint information is gathered and stored as part of the metadata. For local tables this translates into reading the system catalogs. For remote tables this translates into gather information from the remote tables. This information is analyzed against filter conditions to eliminate redundant partitions at compile time of the execution plan. Otherwise appropriate start-up filters are produced to dynamically prune redundant partitions at run time of the execution plans. Generally, these execution plans have conditional logic, called dynamic filters, to control which member table is accessed based on input parameter values. The notion of start-up filters is better described by the following example.

For example, a Customer table is partitioned into three tables:

```
On Data Store1:
CREATE TABLE Customer_33
(CustomerID INTEGER NOT NULL PRIMARY KEY
        CHECK (CustomerID BETWEEN 1 and 32999),
        ...-- Additional Column Definitions)
On Data Store2:
CREATE TABLE Customer_66
(CustomerID INTEGER NOT NULL PRIMARY KEY
        CHECK (CustomerID BETWEEN 33000 and 65999),
        ...-- Additional Column Definitions)
OnDataStore3:
CREATE TABLE Customer_99
(CustomerID INTEGER NOT NULL PRIMARY KEY
        CHECK (CustomerID BETWEEN 66000 and 99999),
        ...-- Additional Column Definitions)
```

The following distributed partitioned view can be created for this exemplary table:

```
CREATE VIEW Customers AS
SELECT * FROM
DataStore1.CompanyDatabase.TableOener.Customers_33
UNION ALL
SELECT * FROM
DataStore2.CompanyDatabase.TableOwner.Customers_66
UNION ALL
SELECT * FROM
DataStore3.CompanyDatabase.TableOwner.Customers_99
```

The following exemplary query may be executed in this newly created distributed partitioned view:

Select * from Customers where CustomerID=23000 or CustomerID=7300

The execution of this query requires data from Data Store 1 and Data Store 3 but, by definition a distributed partitioned view can be issued at any of the data stores. If the query is issued at Data Store 2, the query is decomposed into two SQL queries which are then delegated to Data Store 1 and Data Store 3 and the results are collected at Data Store 2. An exemplary execution plan for such a query may take the form:

Execute at Data Store 1 (Select * from Company Database.TableOwner.Customers_33 where CustomerID=23000)
Execute at Data Store 3 (Select * from CompanyDatabase.TableOwner.Customers_99 where CustomerID=73000)
Collect Results at Data Store 2

In an effort to optimize processing resources the above exemplary query may be modified to use parameters whose value is not known at compile time. The exemplary query (and subsequent execution plan) become:

Select * from Customers where CustomerID=@p or CustomerID=@q

Since the values of @p or @q are not known until run time it is desired to have an execution plan that works for any value of @p and @q, an execution plan that satisfies this parameterized query becomes:

```
If (@p between 1 and 32999) or (@q between 1 and 32999)
    Execute at Data Store 1 (Select * from
    CompanyDatabase.TableOwner.Customers_33 where
    CustomerID = @p or CustomerID = @q)
If (@p between 33000 and 65999) or (@q between 33000 and 65999)
    Execute at Data Store 2 (Select * from
    CompanyDatabase.TableOwner.Customers_66 where
    CustomerID = @p or CustomerID = @q)
If (@p between 66000 and 99999) or (@q between 66000 and 99999)
    Execute at Data Store 3 (Select * from
    CompanyDatabase.TableOwner.Customers_99 where
    CustomerID = @p or CustomerID = @q)
Collect Results at Server 2
```

When executing the values of the @p and @q parameters are populated so that the "if conditions" (i.e. start-up filters) can be evaluated. The cost of evaluating a start-up filter locally is dramatically lower than at participating remote data stores where the query is executed and resulting in a finding that data from the participating remote data stores qualify. Start-up filters provide an efficient mechanism to prune partitions dramatically. Moreover, start-up filters assist in optimizing performance for joins of distributed partitioned views. For example, another table "Orders" may be provided to track the orders for a customer. The "Orders" table has CustomerID (of the "Customers" table) as a foreign key to the "Customers" relation. Accordingly, the "Orders" relation may be partitioned on OrderID as follows:

```
-- On Data Store 1
CREATE TABLE Orders_33
(OrderID INTEGER NOT NULL PRIMARY KEY CHECK (OrderID BETWEEN
100000 AND
    329999),
    CustomerID INTEGER,
    -- Additional column definitions)
-- On Data Store 2
CREATE TABLE Orders_66
(OrderID INTEGER PRIMARY KEY NOT NULL CHECK (OrderID BETWEEN
```

```
330000 AND
    659999),
    CustomerID INTEGER,
    -- Additional column definitions)
    -- On Data Store 3
    CREATE TABLE Orders_99
    (OrderID INTEGER PRIMARY KEY NOT NULL CHECK (OrderID BETWEEN
660000 AND
    999999),
    CustomerID INTEGER,
    -- Additional column definitions)
The corresponding distributed partitioned view for the Orders table becomes:
    CREATE VIEW Orders AS
    SELECT * FROM Server1.CompanyDatabase.TableOwner.Orders_33
    UNION ALL
    SELECT * FROM Server2.CompanyDatabase.TableOwner.Orders_66
    UNION ALL
    SELECT * FROM Server3.CompanyDatabase.TableOwner.Orders_99
```

An exemplary query may be performed on this view to obtain both customer and order information. This query may take the form of:
  Select * from customers C, Orders O
  Where C.CustomerID=O.OrderID Conventional query execution to process this query necessitates gathering the Customers and Orders tables at the issuing data store and executing the join there. However, using dynamic filters and parameterized execution, this query is more efficiently processed. By doing so, the Orders table is scanned and using the index on CustomerID on the Customers table to lookup matching values that will satisfy the query. For local components (e.g. local member tables) this involves doing an index lookup join, and for the remote components (e.g. remote member tables) this involves executing a parameterized remote query.

In the context of start-up filters, once a query is submitted against a distributed partitioned view the system catalogs are read for local tables and gathered from remote data stores for remote tables. This information is analyzed against pre-defined filter conditions to eliminate redundant partitions at compile time. Otherwise appropriate start-up filters are produced to dynamically prune redundant partitions at run time.

For example, a parameterized query may be offered:
  SELECT * FROM Customers WHERE CustomerID=@p The query may be folded in with a view definition, resulting in a query equivalent to:

```
SELECT * FROM (
    SELECT * FROM DataStore1.db.dbo.Customer33 UNION ALL
    SELECT * FROM DataStore1.db.dbo.Customer66 UNION ALL
    SELECT * FROM DataStore1.db.dbo.Customer99 UNION ALL
) AS Customer
WHERE CustomerID = @p
```

Filter expressions are then pushed down into the Customer subquery:

```
SELECT * FROM (
    SELECT * FROM DataStore1.db.dbo.Customer33 WHERE
    CustomerID=@p UNION ALL
    SELECT * FROM DataStore1.db.dbo.Customer66 WHERE
    CustomerID=@p UNION ALL
    SELECT * FROM DataStore1.db.dbo.Customer99 WHERE
    CustomerID=@p UNION ALL
```

During the compilation of queries, the query processor considers the placement of "start-up filter" operators. In an illustrative implementation, the start-up filters are components of MICROSOFT® SQL SERVER 2000™ dynamic plan execution. The generation of start-up filters occur for sub-queries (queries couched in queries) and Boolean scalar predicates.

It is understood that although a distributed database environment having distributed partitioned views executing parameterized query execution plans is provided to illustrate features of this invention, that such environment is merely exemplary as this invention contemplates the execution of literal/constant-based queries in database environments having varying configurations.

Figure 4:
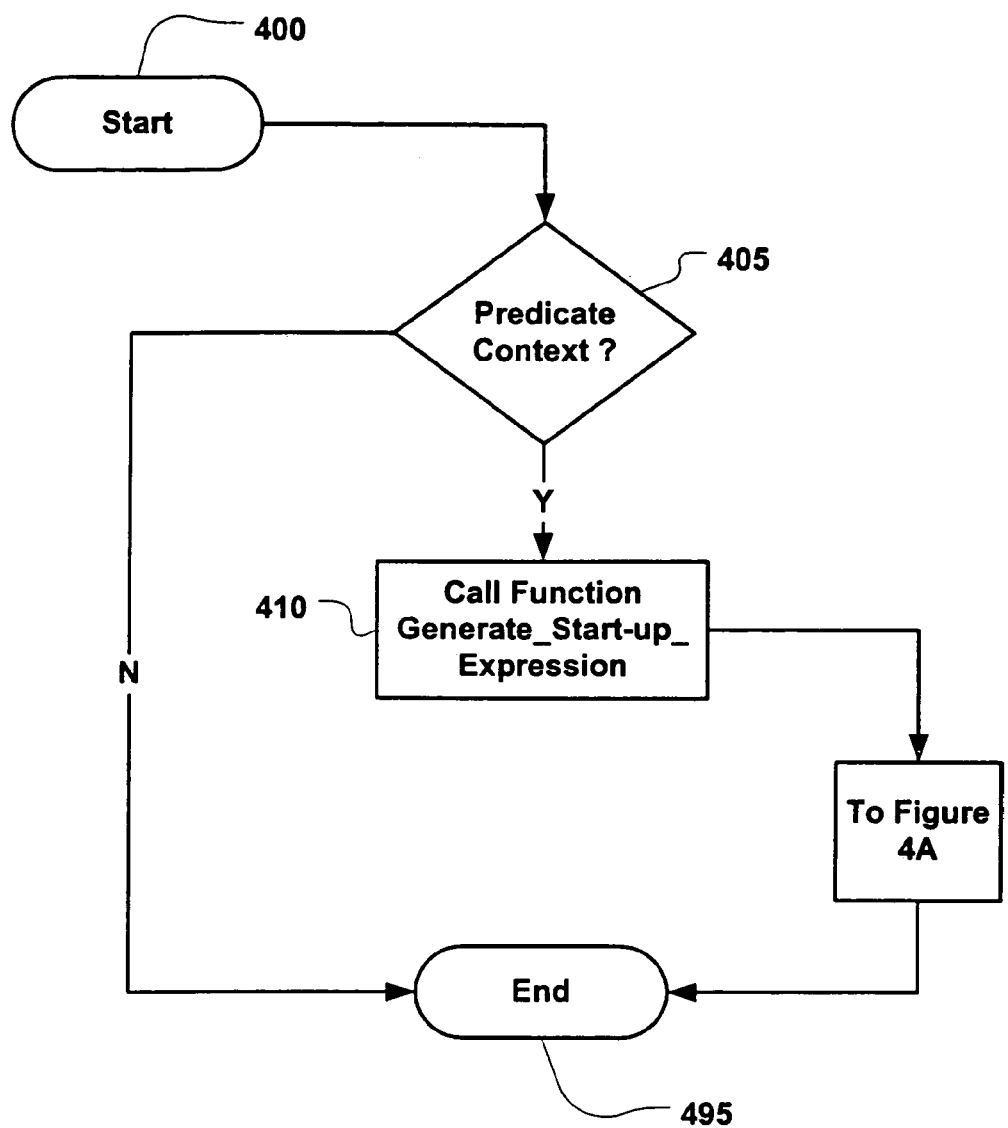
FIG. 4 is a flow diagram of the processing performed to generate efficient scalar-based query executions from scalar predicates in accordance with the present invention.
Figure 4A:
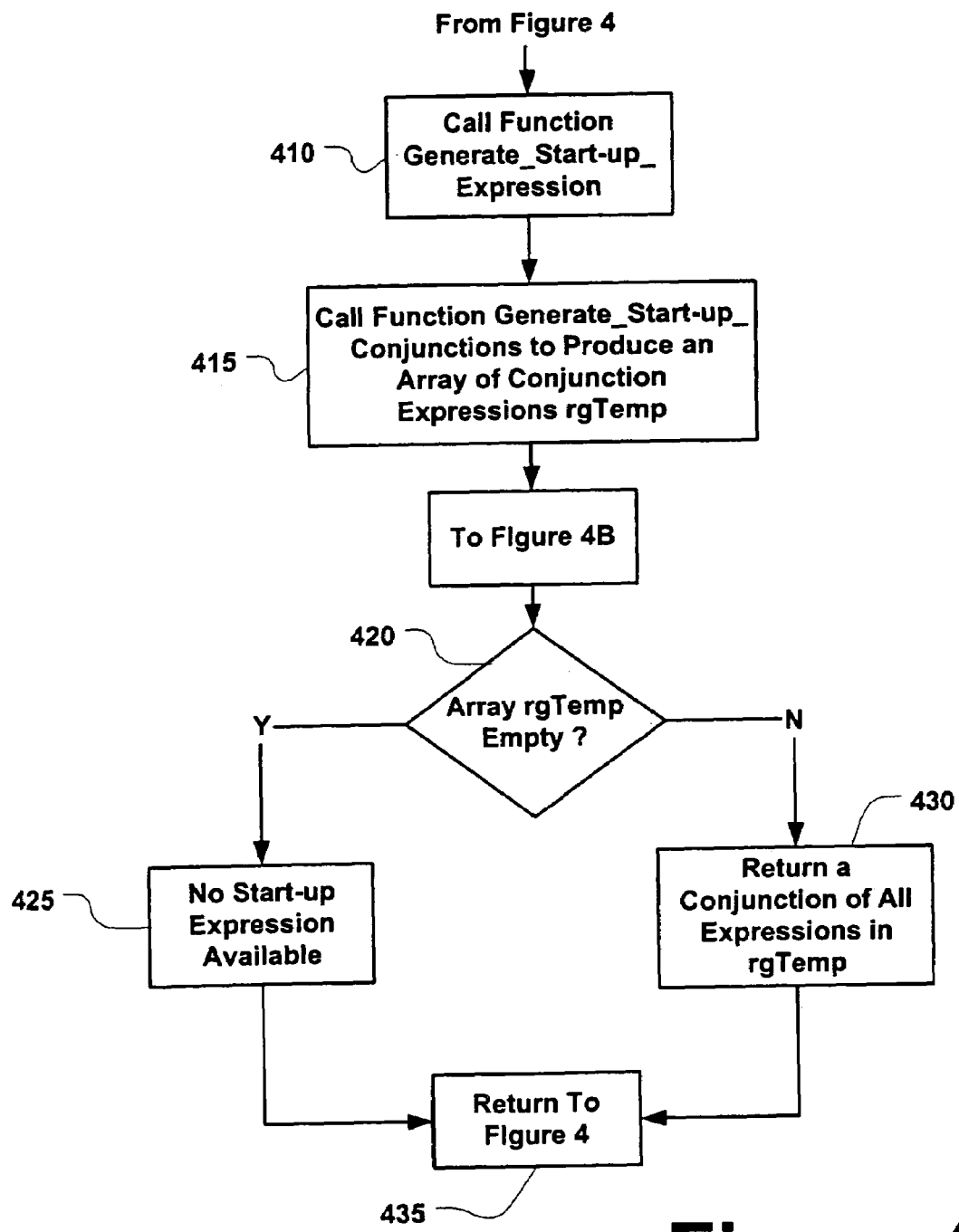
FIG. 4A is a flow diagram of the processing performed to execute steps to generate a start-up expression for a predicate context in accordance with the present invention.
Figure 4B:
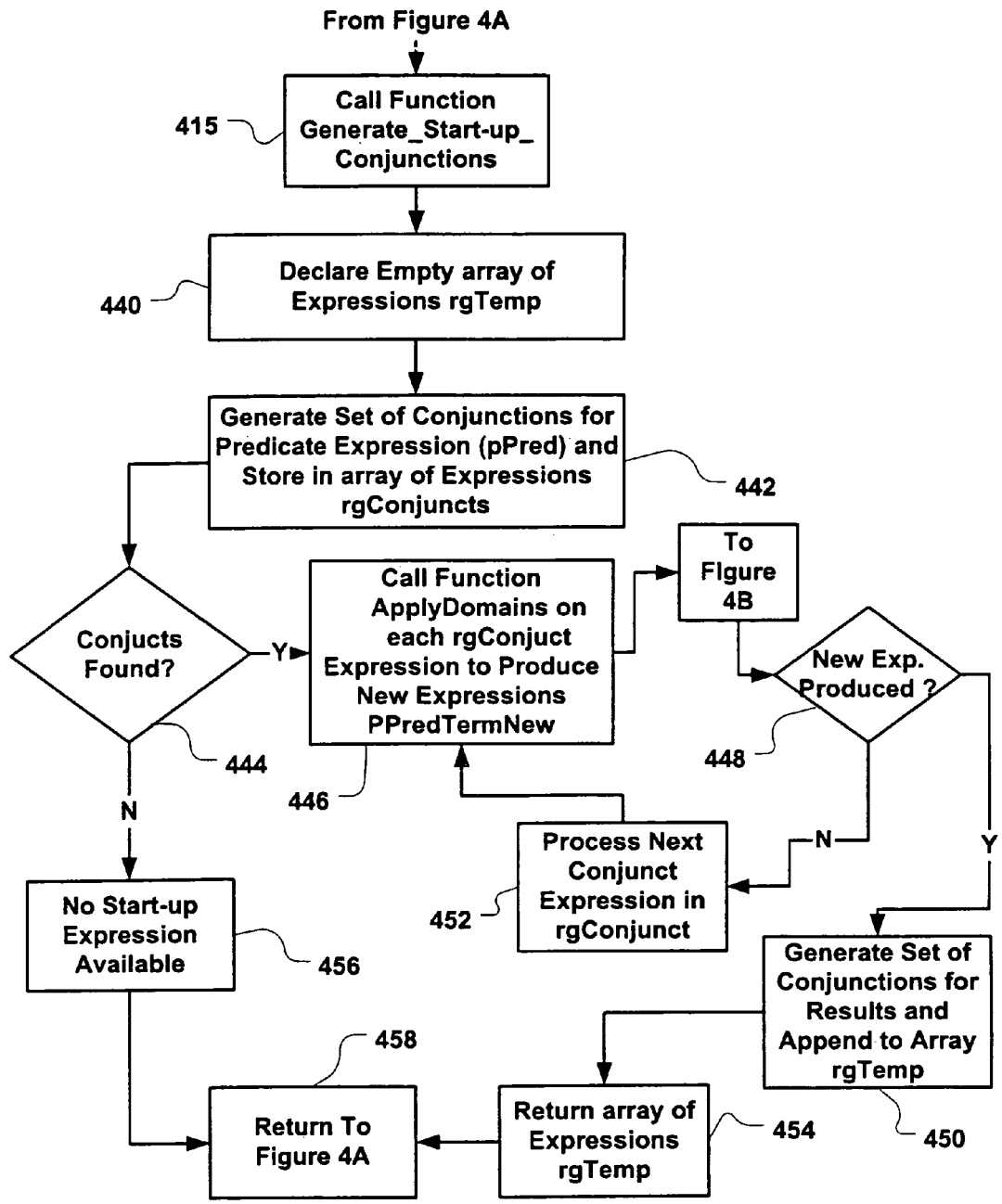
FIG. 4B is a flow diagram of the processing performed to execute query conjunctions in accordance with the present invention.
Figure 4C:
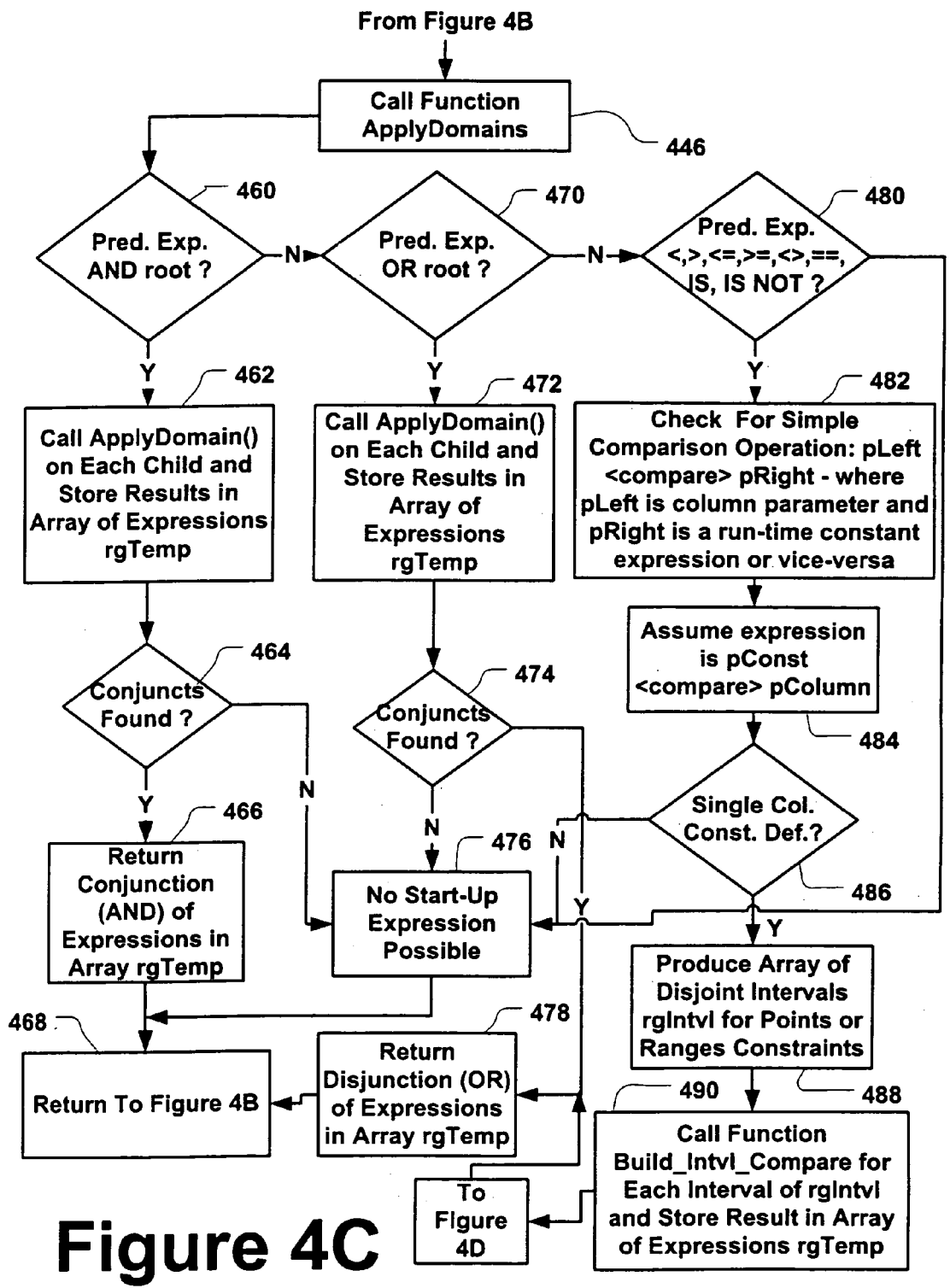
FIG. 4C is a flow diagram of the processing performed to execute the domains function in accordance with the present invention.
Figure 4D:
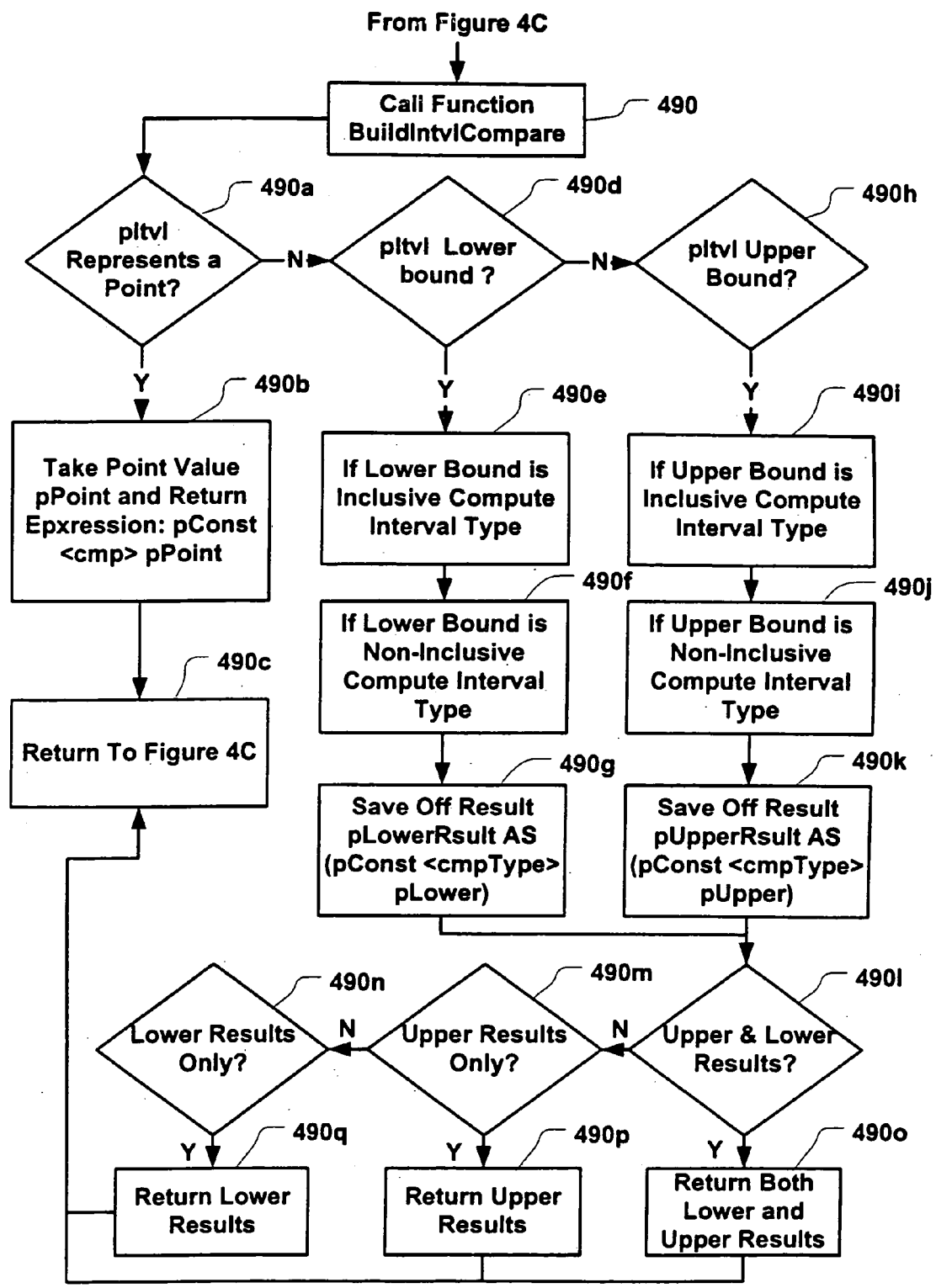
FIG. 4D is a flow diagram of the processing performed to execute the interval function in accordance with the present invention.

FIGS. 4–4D show the processing performed to create and execute start-up filters for scalar predicates. As shown in FIG. 4, processing begins at block 400 and proceeds and proceeds to block 405 where a check is performed to determine if it is a predicate context. If the offered query does not have a scalar predicate processing terminates at block 492. However if the alternative proves to be true, processing proceeds to block 410 where the function Generate_Start-up_Expression is called. Processing then proceeds to FIG. 4A which describes the steps that the Generate_Start-Up_Expression function performs. Processing then terminates at block 495 as shown.

As shown in FIG. 4A, once the Generate_Start-up-Expression function is called at block, 410, processing proceeds to block 415 where the function Generate_Start-up_Conjunctions is called to produce an array of conjunction expressions rgTemp. The processing performed to execute the function Generate_Start-up_Conjunctions is described by FIG. 4B. Once the rgTemp array is generated a check is performed at block 420 to determine if the rgTemp array is empty. If it is empty, processing proceeds to block 425 where it is determined that no-start up expression is available for the offered predicate. Processing then reverts back to FIG. 4. However, if the alternative proves to be true at block 420, that is the rgTemp array is not empty, processing proceeds to block 430 where the conjunction of all the expressions in the rgTemp array is returned. Processing then reverts to FIG. 4 at block 435.

As shown in FIG. 4B, once the function Generate_Startup_Conjunctions is called at block 415, processing proceeds to block 440 where an empty array of expressions rgTemp is declared. From there a set of conjunctions is created for the predicate expression (e.g. the scalar predicate offered in the original query) and stored in array of expressions labeled rgConjuncts. A check is then performed at block 444 to determine if there are any conjuncts found in the rgConjuncts array. If no conjuncts are found, processing proceeds to block 456 where it is determined that no start-up expressions are available. Processing then reverts to FIG. 4A at block 458. However, if the check performed at block 444 shows that there are conjuncts found in the array rgConjuncts, processing proceeds to block 446 where the function ApplyDomains is called for each rgConjunct expression to produce New expressions PpredTermNew. The steps performed to execute the ApplyDomains function are illustrated in FIG. 4C. A check is then performed at block 448 to determine if any new expressions PpredTermNew were created. If no PpredTermNew expressions were created, then processing proceeds to block 452 where the next conjunct from the rgConjuncts array is processed. Processing then reverts to block 446 and proceeds therefrom. However, if the check at block 448 indicates that there are new PpredTermNew expressions are produced, processing proceeds to block 450 to generate a set of conjunctions for results and appends the results to the rgTemp array created in FIG. 4A. Processing then proceeds to block 454 where the rgTemp array of expressions is returned. From there processing reverts to FIG. 4A at block 458.

As shown in FIG. 4C, once the function ApplyDomains is called at step 446, processing proceeds to block 460 where a check is performed to determine if the predicate expression that is part of the offered query has an AND root. If the predicate expression has an AND root, processing proceeds to block 462 where the function ApplyDomain is called on each child of the predicate expression the results of stored in the rgTemp expression array (created in FIG. 4A). From there a check is performed at block 464 to determine if there are any conjuncts from the results (i.e. if there are any values stored in the rgTemp array). If there are no conjuncts processing proceeds to block 476 where it is determined that there are no start-up expressions possible for the offered predicate expression. Alternatively, if the check shows that there are conjuncts, processing proceeds to block 466 where the conjunction (i.e. AND) of the expressions in the rgTemp array is returned. Processing then reverts to FIG. 4B.

However, if at block 460 it is determined that the offered predicate expression is not an AND root, processing proceeds to block 470 where a check is performed to determine whether the offered predicate expression has an OR root. If this check proves positive, processing proceeds to block 472 where the ApplyDomainFunction is called for each child of the predicate expression and the results are stored in the rgTemp array of expressions. A check is then performed at block 474 to determine if the rgTemp array has a conjunct for every child of the predicate as a result of block 472. If there are no conjuncts, processing proceeds to block 476 where it is determined that there are no start-up expression possible for the offered predicate expression. Processing then reverts back to FIG. 4B.

However, if the check at block 474 shows that there are conjuncts found, processing proceeds to block 478 where the disjunction (OR) of the expressions found in the rgTemp array is returned. Processing the reverts back to FIG. 4B.

Alternatively, if the check at block 470 shows that the offered predicate expression does not have an OR root, processing proceeds to block 480 where a check is performed to determine if the offered predicate expression has any of the scalar operators <,>,<=,>=,<>,==, IS, or IS NOT. If the offered predicate expression does not contain one of these scalar operators, processing proceeds to block 476 and proceeds therefrom. However, if the alternative is true, processing proceeds to block 482 where a check is performed for simple comparison operation (e.g. pLeft<compare>pRight—where pLeft is a column parameter and pRight is a run-time constant expression of vice versa). From there processing proceeds to block 484 where an assumption is made that the predicate expression satisfies the condition pConst<compare>pColumn. A check is then performed to determine if there are any single column CHECK constraints defined for the analyzed predicate expression column (pColumn). If there are single column CHECK constraints, processing proceeds to block 476 and therefrom. However, if the check at block 486 shows the existence of single column CHECK constraints for the predicate expression column pColumn, processing proceeds to block 488 where an array of disjoint intervals rgIntvl is produced for point or ranges constraints. Processing then proceeds to block 490 where the function Build_Intvl_Compare for each interval rgIntvl and store the results in array of expressions rgTemp. The steps required to execute the Buil_Intvl_Compare function are described by FIG. 4D. From block 490 processing proceeds to block 478 and proceeds therefrom.

As shown in FIG. 4D, once the function Build_Intvl_Compare is called at step 490, processing proceeds to block 490a where a check is performed to determine if the predicate interval represents a point. If the interval does represent a point, processing proceeds to block 490b where the point value is evaluated and the expression pConst<compare>pPoint is returned. From there processing reverts back to FIG. 4C at block 490c. However, if at block 490a the check shows that the pInvl does not represent a point, processing proceeds to block 490d where a check is performed to determine if the predicate interval (pItvl) is lower bounded. From there processing proceeds to block 490e. If it is determined that the lower bound is inclusive, the interval comparison type is computed by calling the function CompareType(cmp, lowerIncl). Processing then proceeds to block 490f, where it is determined that the lower bound is non-inclusive and that the interval type is calculated by calling the function CompareType(cmp, lowerNonIncl). At block 490g the result of the interval comparison for the lower bounded interval are stored in a variable pLowerRsult (it is saved as pConst<cmpType>pLower). From block 490g processing proceeds to block 490l where a check is performed to determine if both upper and lower results are generated. If there are both upper and lower results, the upper and lower results are returned. From there processing reverts back to FIG. 4C and block 490c. However, if the check at block 490l shows that there are not both upper and lower results, processing proceeds to block 490m where a check is performed to determine if there are upper results. If there are only upper results, the upper results are returned at block 490p. Processing then proceeds to block 490c and therefrom. However, if the check at block 490m shows that there are not upper results only, processing proceeds to block 490n where a check is performed to determine if there are lower results only. If there are lower results, the lower results are returned at block 490q. From there processing proceeds to block 490c and therefrom.

However, if at block 490d the check indicates that the predicate interval is not lower bounded, processing proceeds to block 490h where a check is performed to determine if the predicate interval is upper bounded. If the interval is upper bounded, processing proceeds to block 490i where the interval type is calculated by calling the function CompareType(cmp, uppeIncl) if the upper bound is inclusive. From there processing proceeds to block 490j where the interval type is calculated by calling the function CompareType (cmp, upperNonIncl) if the upper bound is non-inclusive. The results are saved off in a variable pUperRslt (and more specifically as the expression pConst<cmpType>pUpper). From there processing proceeds to block 490l and therefrom.

Figure 5:
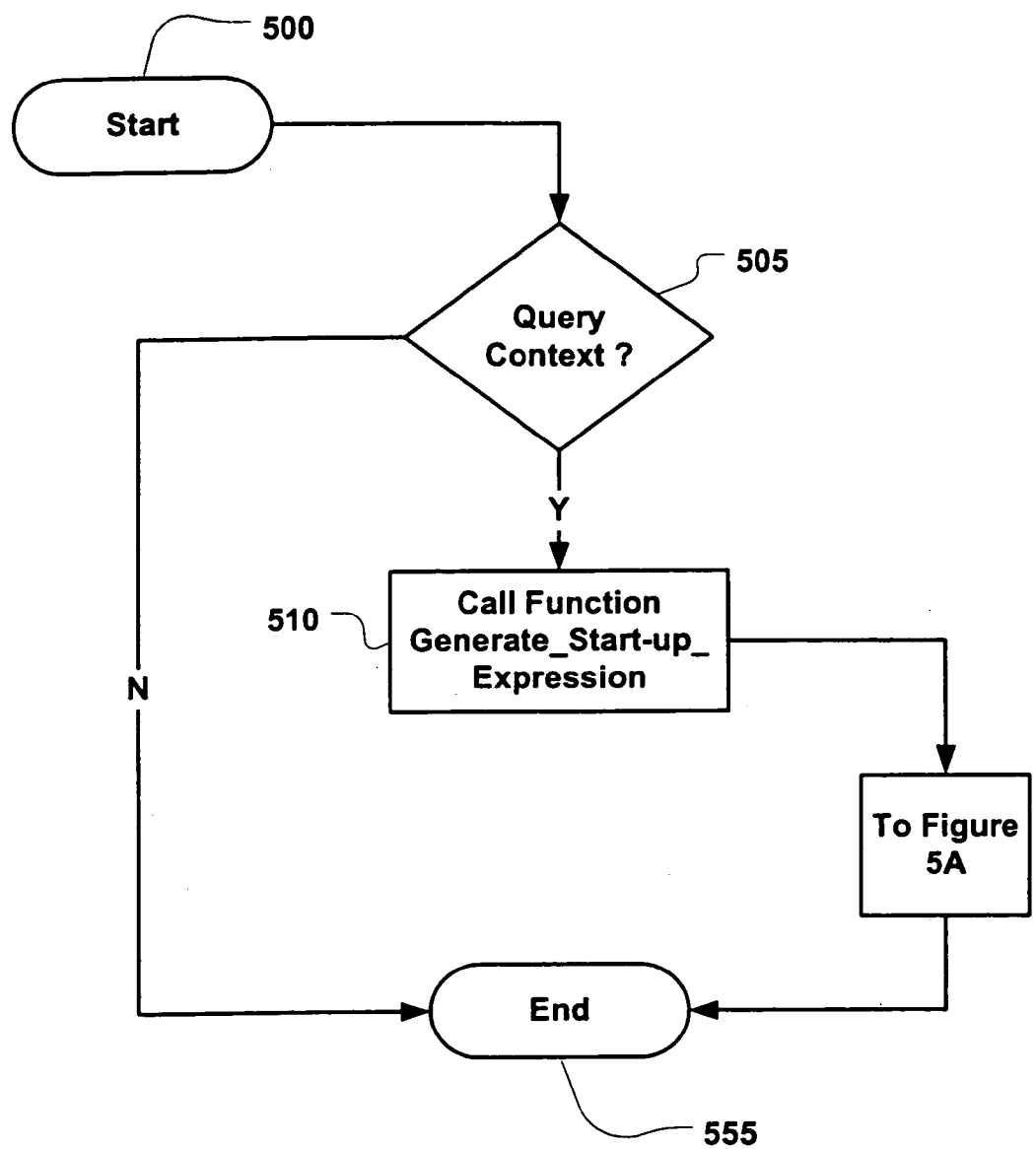
FIG. 5 is a flow diagram of the processing performed to generate efficient query scalar-based query executions from query expressions.
Figure 5A:
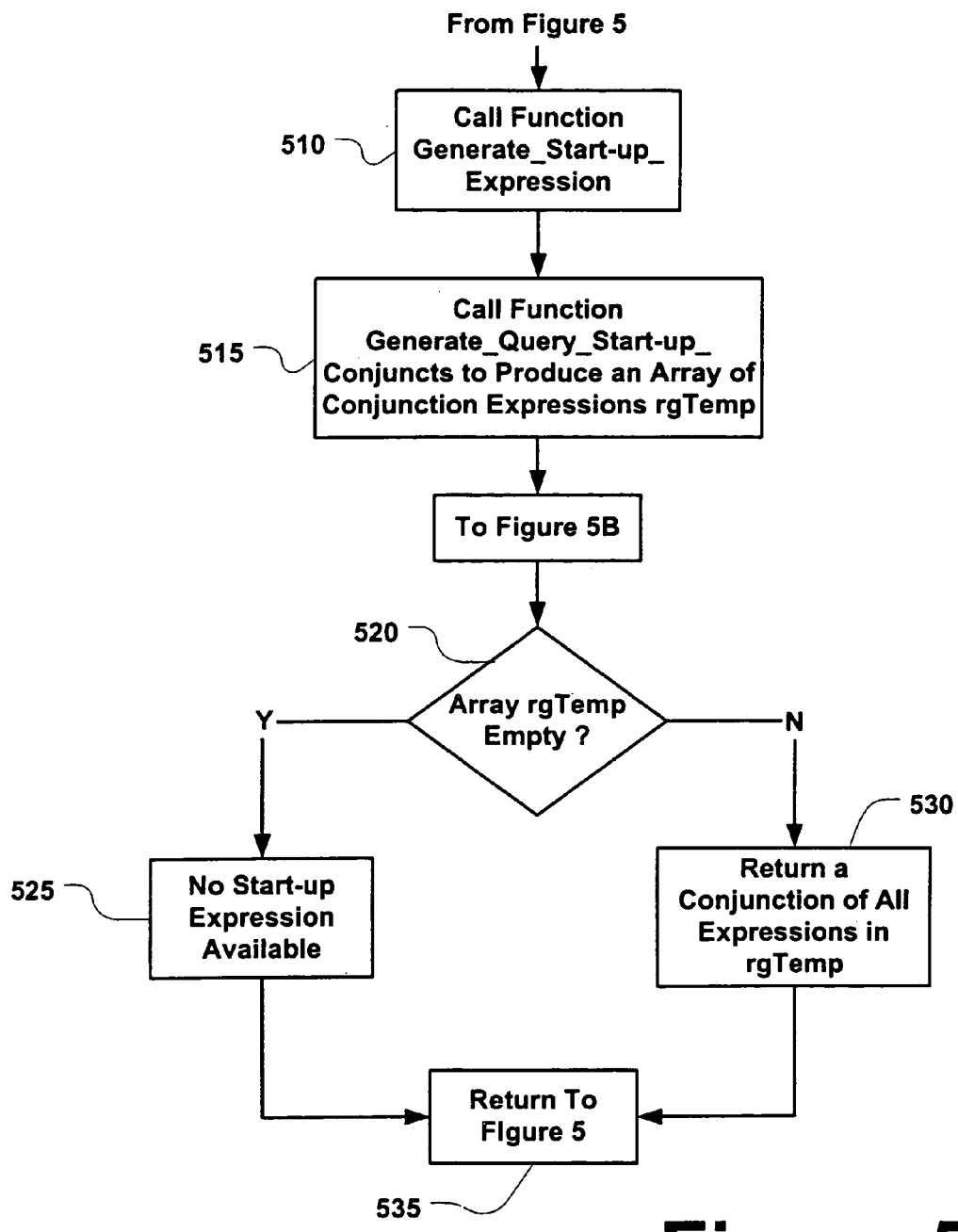
FIG. 5A is a flow diagram of the processing performed to execute the generate start-up expression function for scalar-based queries in accordance with the present invention.
Figure 5B:
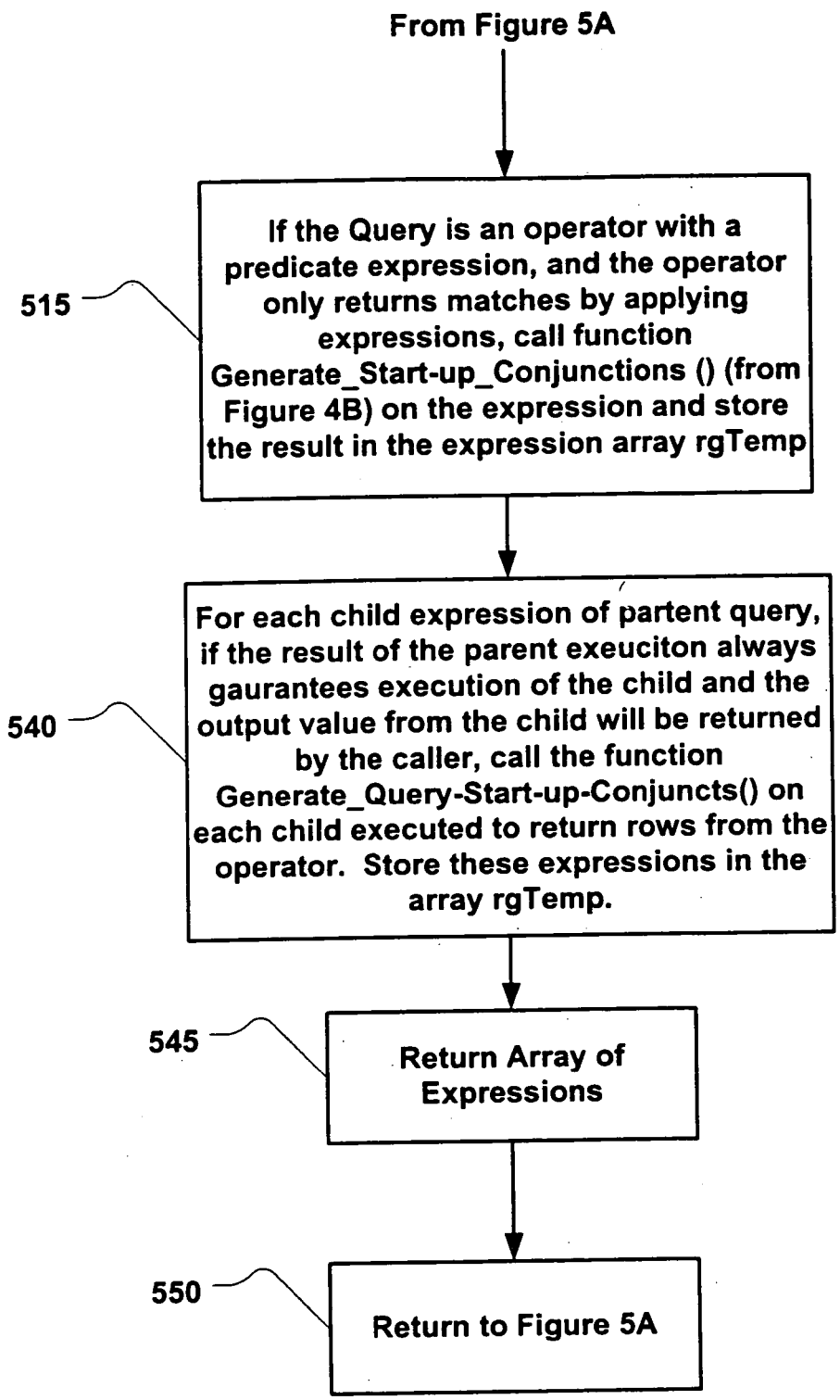
FIG. 5B is a flow diagram of the processing performed to execute the generate query start-up conjuncts for scalar-based queries in accordance with the present invention.

FIGS. 5–5B show the processing performed to create and execute start-up filters for sub-queries. As shown in FIG. 5 processing begins at block 500 and proceeds to block 505 where a check is performed to determine if there are sub-queries in the offered query expression. If the check 505 shows that it is not a query context, processing terminates at block 555. However if the alternative proves true, processing proceeds to block 510 where the function generate_Start-up_Expression is called. The steps to execute this function are described in FIG. 5A. Processing then terminates at block 555.

The function CompareType uses the following table to return the interval type to satisfy the processing required and described in FIG. 4D.

| Cmp | LowerIncl [x . . . | UpperIncl . . . y] | LowerNonIncl (x . . . | UpperNonIncl . . . y) |
|---|---|---|---|---|
| IS | >= | <= | > | < |
| == | >= | <= | > | < |
| IS NOT | > | < | <= | >= |
| != | > | < | <= | >= |
| > | > | <= | > | < |
| < | >= | < | > | < |
| >= | >= | <= | > | < |
| <= | >= | <= | > | < |

As shown in FIG. 5A once the Generate_Start-up_Expresssion is called at block 510, processing proceeds to block 515 where the function Generate_Query_Start-up_Conjuncts is called to produce an array of conjunction expressions rgTemp. The steps performed to execute the Generate_Query_Start-up_Conjuncts are described in FIG. 5B. Once generated, the rgTemp array is check at block 520 to determine if the array is populated. If the array is empty, processing proceeds to block 525 where it is determined that there are no start-up expressions available to satisfy the offered query context. From there processing reverts back to FIG. 5. However, if there are elements in the rgTemp array, processing proceeds to block 530 where the conjunction of all the rgTemp expressions are returned. From there processing reverts back to FIG. 5.

As shown in FIG. 5B, processing is transferred from FIG. 5A to block 515 of FIG. 5B. At block 515, a determination is made to ascertain if the query is an operator with a predicate expression, and the operator only returns matches by applying expressions, then the function Generate_Start-up_Conjunctions (as described in FIGS. 4B, 4C, and 4D) on the expression and the result is stored in the expression array rgTemp. Processing then proceeds to block 540 where for each child expression of the parent query, a determination is made if the result of the parent execution always guarantees execution of the child and the output value from the child is to be returned by the caller, then the function Generate Query_Start-up_Conjuncts is called on each child executed to return rows from the operator. The results of this step are then stored in the array rgTemp that is returned to the caller at block 545. Processing then reverts back to FIG. 5A at block 540.

In summary, the present invention contemplates a system and methods providing the creation and execution of dynamic query execution in database environments. The invention may be used to affect more efficient execution of queries in a local or distributed partitioned environment. Moreover, the system can also be applied to non-partitioned environments where a single local or remote table is used. In an illustrative implementation, the inventive concepts described herein are realized through one or more instances of MICROSOFT® SQL Server 2000™ operating to process data. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A computer-readable medium having computer-executable instructions for performing a method for providing query execution plans for distributed database environments having distributed partitioned views comprising the steps of:
   analyzing offered queries to determine if said offered queries comprise predicate expressions or sub-queries;
   providing dynamic start-up filters for inclusion in query execution plans, said start-up filters, when applied, removing redundant partitions from query plan execution, wherein the dynamic start-up filters are chosen based on the predicate expressions found in the offered queries;
   classifying said offered queries according to whether said offered queries comprise predicate expressions and sub-queries;
   executing a function to generate start-up expressions for said offered queries having said predicate expressions;
   executing a function to generate start-up conjunctions such that an array of conjunction expressions is created for each of said predicate expressions found in said offered queries;
   performing a check to determine if said array is empty;
   returning no start-up filters if said array is empty; and
   returning conjunctions of all expressions in said array if said array is not empty.

2. A computer-readable medium having computer-executable instructions for performing a method for providing query execution plans for distributed database environments having distributed partitioned views comprising the steps of:
   analyzing offered queries to determine if said offered queries comprise predicate expressions or sub-queries;
   providing dynamic start-up filters for inclusion in query execution plans, said start-up filters, when applied, removing redundant partitions from query plan execution, wherein the dynamic start-up filters are chosen based on the predicate expressions found in the offered queries;
   classifying said offered queries according to whether said offered queries comprise predicate expressions and sub-queries;
   executing a function to generate start-up expressions for said offered queries having said predicate expressions;
   executing a function to generate start-up conjunctions such that an array of conjunction expressions is created for each of said predicate expressions found in said offered queries; and
   generating a set of conjunctions and storing said set of conjunctions in a conjunction array for each of said predicate expressions.

3. The computer-readable medium of claim 2, having further computer-executable instructions for performing the steps of:
   performing a check to determine if conjuncts are found in said conjunction array; and
   returning no start-up filters if no conjuncts are found in said conjunction array.

4. The computer-readable medium of claim 2, having further computer-executable instructions for performing the step of executing a function to apply domains on each conjunction found in said conjunction array.

5. The computer-readable medium of claim 4, having further computer-executable instructions for performing the steps of:
   performing a check to determine if new expressions are produced from executing said apply domains function on said each conjunction of said conjunction array;
   generating a new set of conjunctions for appendage to said array of conjunction expressions; and
   returning said array of conjunction expressions.

6. The computer-readable medium of claim 4, having further computer-executable instructions for performing the step of processing said predicated expressions to ascertain a scalar found in each of said expressions.

7. The computer-readable medium of claim 6, having further computer-executable instructions for performing the steps of:
   executing said apply domain function for each child of said predicate expression for predicate expressions having an AND root;
   storing results in said array of conjunction expressions;
   performing a check to determine if any conjuncts are present in said array of conjunction expressions;
   returning no start-up filters if no conjuncts are found; and
   returning the conjunction of expressions found in the array of conjunction expressions if conjuncts are found.

8. The computer-readable medium of claim 7, having further computer-executable instructions for performing the steps of:
   executing said apply domain function for each child of said predicate expression for predicate expressions having an OR root;
   storing said results in said array of conjunction expressions;
   performing a check to determine if all children of the OR root produced conjuncts stored in the array;
   returning no start-up filters if no conjuncts are found or produced by all children; and
   returning disjunction of expressions found in the array of conjunction expressions if conjuncts are found.

9. The computer-readable medium of claim 7, having further computer-executable instructions for performing the steps of:
   performing a check for simple comparison operations for predicate expressions comprising scalars comprising any of <,>,<=,>=,<>,==, IS, and IS NOT;
   performing a check to determine if any there are any single column CHECK constraints defined;
   producing array of disjoint intervals for identified points and ranges constraints;
   executing a function to build interval compares for each of said produced disjoint intervals; and
   storing results of said build interval function is said array of conjunction expressions.

10. The computer-readable medium of claim 9, having further computer-executable instructions for performing the steps of:
    performing a check to determine if any conjuncts are present in said array of conjunction expressions;
    returning no start-up filters if no conjuncts are present in said array of conjunction expressions; and
    returning the disjunction of expressions in said array of conjunction expressions if conjuncts are present.

11. The computer-readable medium of claim 9, having further computer-executable instructions for performing the steps of:
    performing a check to determine if predicate expression interval represents a point; and
    returning an expression for said predicate expression interval comprising a point.

12. The computer-readable medium of claim 9, having further computer-executable instructions for performing the steps of:
- performing a check to determine if predicate expression interval has a lower bound;
- calculating interval type for inclusive lower bounds; and
- calculating interval type for non-inclusive lower bounds.

13. The computer-readable medium of claim 9, having further computer-executable instructions for performing the steps of:
- performing a check to determine if predicate expression interval has an upper bound;
- calculating interval type for inclusive upper bound; and
- calculating interval type for non-inclusive upper bound.

14. The computer-readable medium of claim 9, having further computer-executable instructions for performing the steps of:
- performing a check to determine if lower bound and upper bound results are calculated;
- returning both upper and lower bound results if upper and lower bound results are produced;
- returning lower bound results if lower bound results are only produced; and
- returning upper bound results if upper bound results are only produced.

15. A computer-readable medium having computer-executable instructions for performing a method for providing query execution plans for distributed database environments having distributed partitioned views comprising the steps of:
- analyzing offered queries to determine if said offered queries comprise predicate expressions or sub-queries;
- providing dynamic start-up filters for inclusion in query execution plans, said start-up filters, when applied, removing redundant partitions from query plan execution, wherein the dynamic start-up filters are chosen based on the predicate expressions found in the offered queries;
- classifying said offered queries according to whether said offered queries comprise predicate expressions and sub-queries;
- executing a function to generate start-up expressions for said offered queries having said sub-queries;
- executing a function to generate query start-up conjuncts, said query start-up conjuncts generation function producing an array of conjunction expressions;
- performing a check to determine if said array of conjunction expressions contains conjuncts;
- returning no start-up filters if no conjuncts are present in said array of conjunction expressions; and
- returning conjunctions of all conjuncts present in said array of conjunction expressions.

16. A computer-readable medium having computer-executable instructions for performing a method for providing query execution plans for distributed database environments having distributed partitioned views comprising the steps of:
- analyzing offered queries to determine if said offered queries comprise predicate expressions or sub-queries;
- providing dynamic start-up filters for inclusion in query execution plans, said start-up filters, when applied, removing redundant partitions from query plan execution, wherein the dynamic start-up filters are chosen based on the predicate expressions found in the offered queries;
- classifying said offered queries according to whether said offered queries comprise predicate expressions and sub-queries;
- executing a function to generate start-up expressions for said offered queries having said sub-queries;
- executing a function to generate query start-up conjuncts, said query start-up conjuncts generation function producing an array of conjunction expressions;
- performing a check to determine if query is an operator with a predicate expression and the operator only returns matches by applying expressions;
- executing a function to generate start-up conjunctions on expression;
- executing a function to generate query start-up conjuncts on each child executed if a result of parent execution is an execution of the child and an output value from the child is returned;
- storing results in said array of conjunction expressions; and
- returning said array of conjunction expressions.

* * * * *